United States Patent [19]
Glance

[11] 3,761,125
[45] Sept. 25, 1973

[54] ENERGY ABSORBING SEAT BACK
[75] Inventor: Patrick M. Glance, Plymouth, Mich.
[73] Assignee: Ford Motor Company, Dearborn, Mich.
[22] Filed: May 12, 1972
[21] Appl. No.: 252,805

[52] U.S. Cl. .................................. 297/216, 297/390
[51] Int. Cl. ............................................. B60r 21/02
[58] Field of Search................... 297/216, 396, 284, 297/379, 373, 374, 375, 408

[56] References Cited
UNITED STATES PATENTS
| | | | |
|---|---|---|---|
| 2,636,552 | 4/1953 | Long | 297/216 |
| 2,813,577 | 11/1957 | Weekly | 297/396 |
| 3,544,164 | 12/1970 | Ohta | 297/216 |

Primary Examiner—James T. McCall
Assistant Examiner—Darrell Marquette
Attorney—Keith L. Zerschling et al.

[57] ABSTRACT

A vehicle seat in which the side frame members are articulated intermediate their ends and are pivotally mounted on the seat cushion structure. The pivot joints are friction joints that are preloaded to predetermined torsional resistances. The area of the backrest above the upper or articulating pivots provides an impact area adapted under vehicle collision conditions to receive an impact load from a rear seat occupant's head. The area of the backrest between the backrest to cushion pivots and the articulating pivots functions similarly with respect to back seat occupant knee impacts. The friction joints permit rotation of the upper area of the backrest or rotation of the entire backrest relative to the seat cushion, the rotation occurring at a controlled rate as predetermined by the preloading on the pivot joints, thereby controlling the deceleration of the occupant impacting thereagainst.

5 Claims, 3 Drawing Figures

PATENTED SEP 25 1973 3,761,125
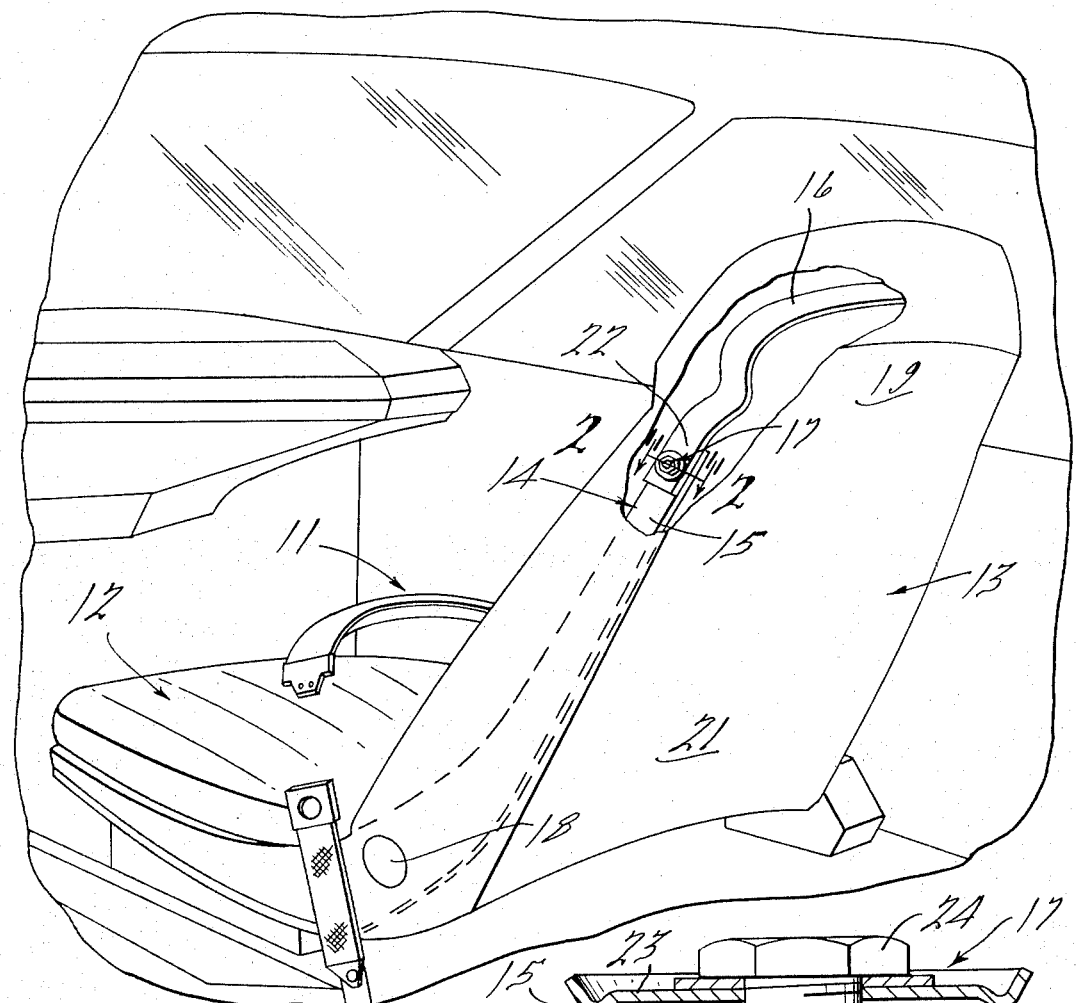
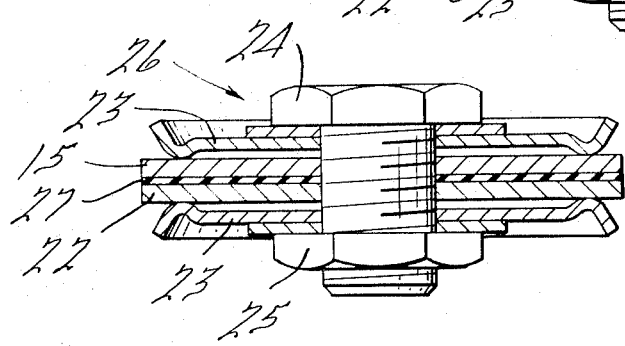

ENERGY ABSORBING SEAT BACK

BACKGROUND OF THE INVENTION

During a vehicle collision, particularly a front-end impact, the rear seat occupant often will impact the back of a front seat. It has been proposed in the prior art to construct the front seat backrest structures as energy absorbing structures to control the deceleration of the impacting occupant.

U.S. Pat. No. 2,636,552 issued Apr. 28, 1953 discloses an articulated seat back structure having its top portion yieldable under spring tension. The spring structures, however, have the inherent disadvantage that the displacement is followed by a rebound effect.

U.S. Pat. Nos. 3,501,200 issued Mar. 17, 1970 entitled "Seat Reinforcing Plate Construction" and 3,544,164 issued Dec. 1, 1970 entitled "Seat Frame Construction," both granted to Seizo Ohta, disclose structures having members that are permanently deformable when functioning as energy absorbing devices, as does U.S. Pat. No. 3,545,808 entitled "Motor Vehicle Seat," issued Dec. 8, 1970 to Ernst Gescheidle.

It is an object of the present invention to provide a vehicle seat structure utilizing pivot joints to provide displacement for the rear seat occupant, the pivot joints being friction joints constructed and arranged to function to control the rear seat occupant's deceleration under impact conditions. The proposed seat system will function best if the rear seat occupant is belted, although it also will provide substantial safety to an unbelted occupant.

SUMMARY OF THE INVENTION

The present invention relates to a vehicle seat comprising a seat cushion structure and a backrest structure. The backrest structure comprises a frame having a pair of substantially upright, spaced, side members joined across the upper ends thereof. Each side member is articulated intermediate its ends by a first pivot means. A similar second pivot means pivotally connects each side member adjacent its lower end to side members of the cushion structure. The pivot means comprises preloaded friction joints.

The area of the backrest structure above the first pivot means provides an impact area adapted under collision conditions to receive an impact load from a rear seat occupant's head. The portion of the backrest structure above the first pivot means is rotatable at a controlled rate about the friction joint means to control deceleration of an occupant impacting thereagainst.

The area of the backrest structure between the frst and second pivot means provides an impact area adapted under vehicle collision conditions to receive an impact load from a rear seat occupant's knees. The backrest structure upon being impacted by the occupant's knees also is rotatable at a controlled rate about the friction joint pivot means to control occupant deceleration.

The preload on the first pivot means may be substantially less than that on the second pivot means. This difference in preload force would permit the backrest structure above the first pivot means to rotate under a predetermined impact force without causing rotational movement of the entire backrest structure about the first pivot means.

DESCRIPTION OF THE DRAWING

Further features and advantages of the present invention will be made more apparent as this description proceeds, reference being had to the occupanying drawings, wherein:

FIG. 1 is a perspective view of a vehicle seat constructed in accordance with the present invention;

FIG. 2 is a section view taken on the line A—A of FIG. 1; and

FIG. 3 is a view in part similar to FIG. 2 illustrating a second embodiment of the present invention.

DETAILED DESCRIPTION OF THE INVENTION

Referring now to FIG. 1, there is illustrated a vehicle seat, generally designated 11. The vehicle seat 11 is of the configuration or type commonly known as a bucket seat. It has a seat cushion structure 12 and a backrest structure 13. The backrest structure comprises a frame 14 having a pair of substantially upright, spaced, tubular or stamped side members 15 (only one of which is visible) joined across the upper ends by a cross member 16.

A first pivot means, generally designated 17, articulates the side members 15 near the top of the backrest structure. A second pivot means, generally designated 18, pivotally connects each side member 15 adjacent its lower end to side members (not shown) of the cushion structure 12 in a well-known manner. The first and second pivot means, 17 and 18, respectively, are similarly constructed and arranged. They are designated by different reference numerals for purposes of functional description, as will be explained.

Referring particularly to FIG. 2, each pivot means 17 (or 18) is a preloaded friction joint which resists displacement of the upper portion 19 of the seat backrest structure 13 relative to the lower portion 21 and displacement of the entire seat backrest structure 13 relative to the seat cushion structure 12.

Each pivot means or friction joint 17 (18) comprises the abutting inner surfaces of the various seat structure frame members involved. For example, FIG. 2 may be considered as representing the friction joint on the section line 2—2 of FIG. 1 in which the side frame member 15 inner surface contacts or abuts the inner surface of the depending leg portion 22 of the cross member 16. Spaced pressure washers 23 abut the exterior surfaces of the members 15 and 16. A bolt 24 and nut 25 assembly having the bolt projecting through the washers 23 and members 15 and 16 completes the friction joint 17.

The friction joint 18 is similar in design and function to the friction joint 17 except that the lower end of the frame member abuts a seat cushion supporting frame member (not shown).

As will be readily understood, the torque resistance at each of the friction joints may be controlled by the degree to which each bolt 24 is torqued or tensioned during assembly.

In FIG. 3, the friction joint is designated 26 and discloses a means of achieving a substantial reduction in assembly torque or tension on the bolt assembly. This can be done by placing a friction disc 27 made of brake lining type material or other suitable rubberized material between the members 15 and 16. The same amount of torque applied to the bolt results in greater torsional resistance in the joint if it is desired to take advantage of the higher coefficient of friction of brake lining or rubberized material.

In the seat structure exemplifying the present invention the area of the backrest structure above the first pivot means 17 provides an impact area adapted under collision conditions to receive an impact load from a rear seat occupant's head. The area of the backrest structure between the pivot means 17 and the lower pivot means 18 provides an impact area adapted under vehicle collision conditions to receive an impact load from a rear seat occupant's knees. If the vehicle is brought to a sudden stop, as a result of a collision or emergency application of the vehicle brakes, the rear seat occupant normally will be thrown in a forward direction against the backrest structure. The vehicle's rear seat occupant's head will engage the upper surface of the backrest causing a force to be applied thereto having a component normal to the plane of the backrest structure. The friction joint 17, there being one on each side of the seat structure, permits the upper portion of the backrest as represented by the cross member, to rotate forwardly. The torsional resistance in the friction joints 17 to such forward rotation enables the deceleration of the part of the occupant impacting thereagainst, in this case the head portion, to occur at a controlled deceleration rate.

It should be understood that normally the torsional resistance to rotation of the seat back structure about the lower pivots 18 is intended to be somewhat greater than that about the pivots 17. Thus, the upper portion of the backrest when impacted only by the head of the rear seat occupant will rotate about the pivot axis of the pivot means 17 without causing corresponding movement of the lower portion of the backrest about the pivot axis of the pivot means 18.

If the impact forces bringing the vehicle to a stop are sufficiently great, the vehicle seat occupant will be bodily lifted out of the rear seat so that his knees will abut the lower impact area of the backrest structure thereby causing the backrest structure to tilt or rotate forwardly about the pivot axis defined by the friction means 18. Here again, the torsional resistance of the friction joints 18 to such rotational movement of the backrest structure has the desired effect of controlling the rear seat occupant's deceleration.

Within limits, the deceleration of the rear seat occupant upon impacting the front seat backrest structure will be at a rate to avoid substantial injury to the rear seat occupant.

It should be understood that the rotational movement of the backrest structure could include rotational movement of the upper portion of the backrest about the pivot axes of the friction means 17 prior to or simultaneously with rotation of the lower portion of the backrest about the frictional means 18.

The seat system embodying the present invention will function best if the rear seat occupant is belted, although it is expected that substantial protection will be provided for the unbelted rear seat occupant. The "friction joint" concept can be designed to produce a square wave (highly efficient) energy curve.

It is to be understood that the invention is not limited to the exact construction illustrated and described above, but that various changes and modifications may be made without departing from the spirit and scope of the invention as defined by the following claims:

I claim:

1. A vehicle seat comprising a seat cushion structure and a backrest structure,
    the backrest structure comprising a frame having a pair of substantially upright, spaced, side members joined across the upper ends thereof,
    first pivot means articulating each side member intermediate its ends,
    second pivot means pivotally connecting each side member adjacent its lower end to side members of the cushion structure,
    the pivot means comprising preloaded friction joints,
    the area of the backrest structure above the first pivot means providing an impact area adapted under collision conditions to receive an impact load from a rear seat occupant's head,
    the portion of the backrest structure above the first pivot means being rotatable at a controlled rate about the friction joint first pivot means to control deceleration of the part of the occupant impacting thereagainst,
    the area of the backrest structure between the first and second pivot means providing an impact area adapted under vehicle collision conditions to receive an impact load from a rear seat occupant's knees,
    the backrest structure upon being impacted by the occupant's knees being rotatable at a controlled rate about the friction joint second pivot means to control occupant deceleration.

2. A vehicle seat according to claim 1, in which:
    each preloaded friction joint comprises metal to metal contact between abutting interior surfaces of adjacent side members,
    pressure washers abutting exterior surfaces of the side members,
    and a bolt and nut assembly having the bolt projecting through the abutting side members and the washers,
    the bolt and nut assembly being torqued a predetermined amount to provide a friction joint capable of absorbing the energy of impact forces transmitted from the upper and lower backrest structure impact areas thereby to decelerate the forward movement of the impacting occupant.

3. A vehicle seat according to claim 2, in which:
    the preload on the first pivot means is substantially less than that on the second pivot means whereby the portion of the backrest structure above the first pivot means is rotatable under a predetermined impact force without causing rotational movement of the entire backrest structure about the second pivot means.

4. A vehicle seat according to claim 1, in which:
    at least one of the pairs of upper and lower friction joints each comprising a material having a high coefficient of friction interposed between abutting internal side member surfaces,
    pressure washers abutting exterior surfaces of the side members,
    and a bolt and nut assembly having the bolt projecting through the abutting side members and washers,
    the bolt and nut assembly under predetermined torque providing a friction joint capable of absorbing the energy of impact forces transmitted from the upper and lower backrest structure impact areas thereby to decelerate the forward movement of the impacting occupant.

5. A vehicle seat according to claim 4, in which: the preload on the first pivot means is substantially less than that on the second pivot means whereby the portion of the backrest structure above the first pivot means is rotatable under a predetermined impact force without causing rotational movement of the entire backrest structure about the second pivot means.

* * * * *